United States Patent [19]

Maldavs

[11] 4,077,433
[45] Mar. 7, 1978

[54] QUICK COUPLING DEVICE

[75] Inventor: Ojars Maldavs, Lincoln, Nebr.

[73] Assignee: The Bruning Company, Lincoln, Nebr.

[21] Appl. No.: 687,001

[22] Filed: May 17, 1976

[51] Int. Cl.² ............................................. F16L 37/28
[52] U.S. Cl. ................................................ 137/614.04
[58] Field of Search ...................... 137/614.02, 614.03, 137/614.04, 614.05

[56] References Cited

U.S. PATENT DOCUMENTS

| 1,107,041 | 8/1914 | Cook | 137/614.04 X |
| 3,039,794 | 6/1962 | DeCenzo | 137/614.03 |
| 3,049,148 | 8/1962 | Richardson | 137/614.04 X |
| 3,482,602 | 12/1969 | Jarnagan | 137/614.03 |
| 3,490,491 | 1/1970 | Kopaska | 137/614.05 |
| 3,791,411 | 2/1974 | Bogeskov | 137/614.02 |

Primary Examiner—Robert G. Nilson
Attorney, Agent, or Firm—Tilton, Fallon, Lungmus & Chestnut

[57] ABSTRACT

A quick coupling device for coaction with a check valve-equipped male device having an L-shaped passage therein with a piston-equipped spool mounted in the portion of the passage receiving the male device.

16 Claims, 11 Drawing Figures

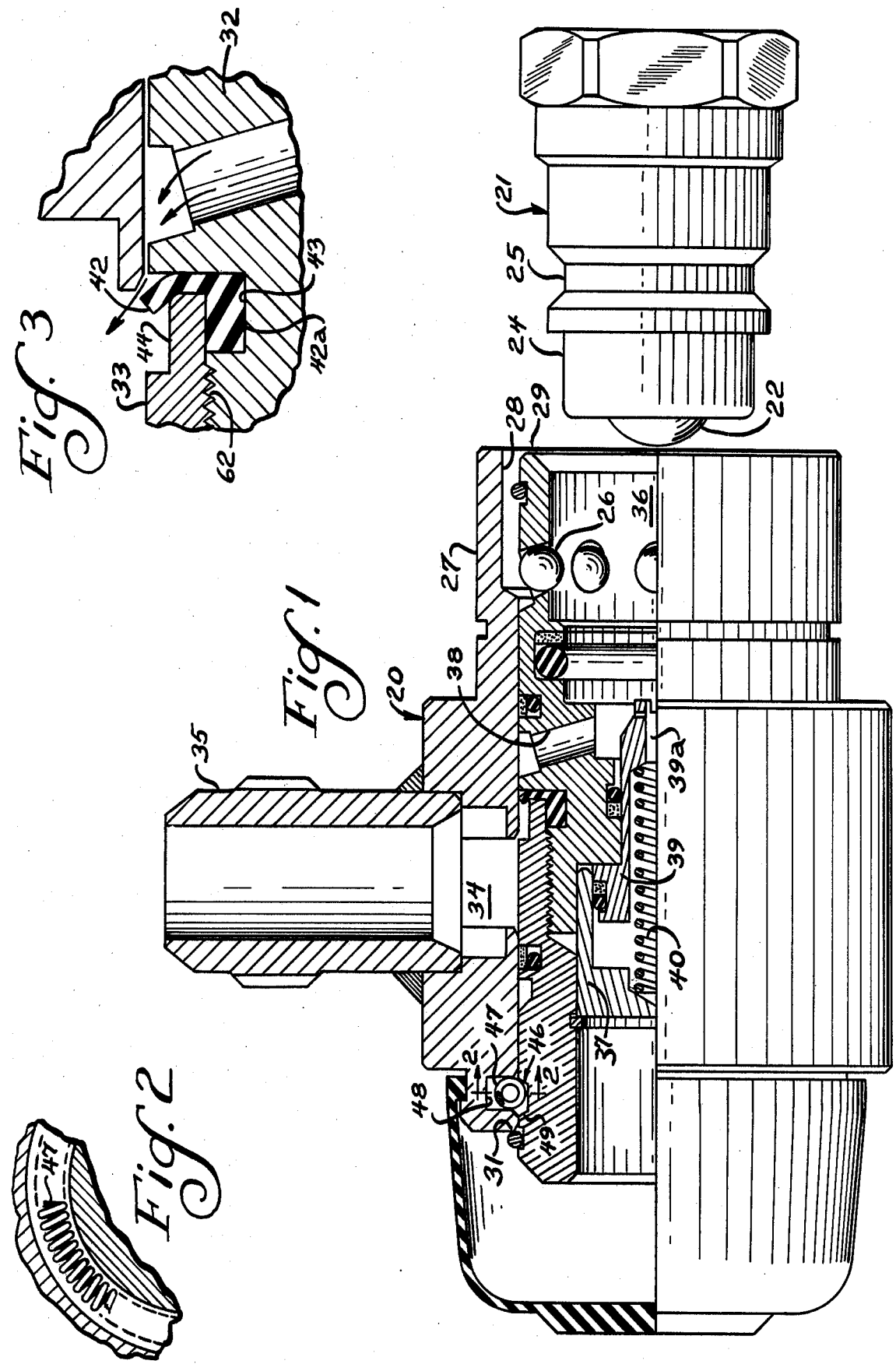

QUICK COUPLING DEVICE

BACKGROUND AND SUMMARY OF INVENTION

This invention relates to a quick coupling device and, more particularly, one used in connection with pressure fluid. For example, agricultural tractors have a quick disconnect coupling for connecting and disconnecting hydraulic hoses between the tractor and an implement. Normally, the female coupling half is on the tractor and the male coupling half is on the implement hose. Historically, both coupling halves were equipped with check valves which permitted axial flow.

Due to a closed-center valve on the tractor and a blocked circuit on the implement, conditions have been possible where internal hydraulic pressure fluid is trapped in one coupling half or even in both halves. Conventional couplings under such circumstances will not connect because the internal pressure creates a greater force than can be exerted manually to make the connection.

According to the invention, this undesirable state of affairs is avoided through the provision of a piston equipped spool in the female coupling device for contacting the male coupling check valve and establishing a generally L-shaped pressure fluid path within the female coupling. Further, the invention provides a novel seal which operates to prevent damage from high pressure build up.

Other objects and advantages of the invention may be seen in the details of the ensuing specification.

DETAILED DESCRIPTION

The invention is described in conjunction with an illustrative embodiment in the accompanying drawing, in which FIG. 1 is an elevational view, partially in section of the inventive coupling device and also showing to the right thereof a conventional male coupling half;

FIG. 2 is a fragmentary sectional view of the garter spring seen in the upper left hand portion of FIG. 1;

FIG. 3 is an enlarged fragmentary sectional view of a portion of the device in one phase of its operation;

Figure 4:
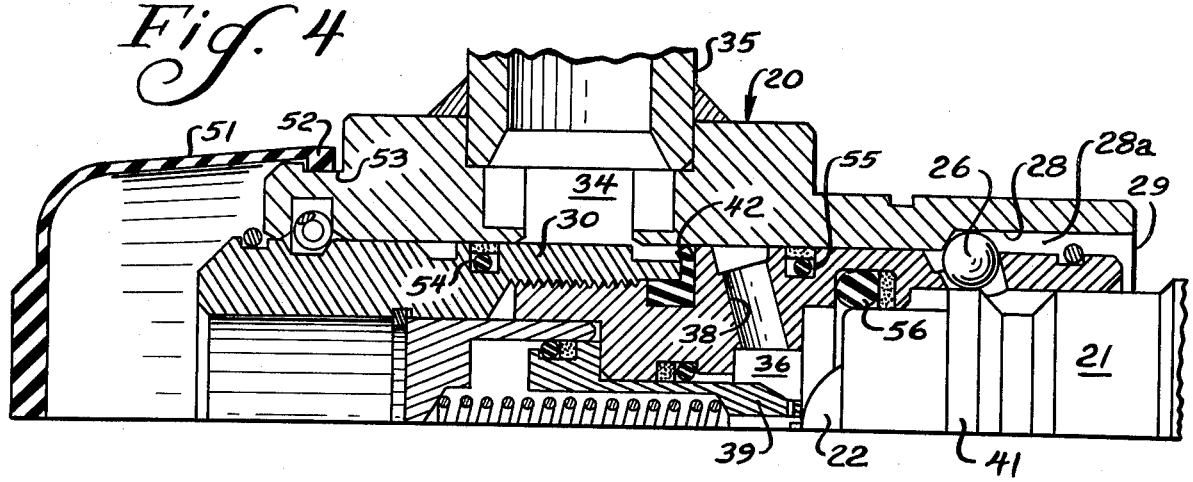
FIGS. 4–6 are fragmentary sectional views of the inventive device showing a sequence of operations in connecting the same with a male device.

In the illustration given, and with reference first to FIG. 1, the numeral 20 designates generally the inventive female quick coupling device and the numeral 21 generally designates a conventional male coupling half. As such, the male half 21 includes the conventional ball check valve 22 resiliently urged against a seat 23 (see FIG. 6) provided within a generally cylindrical casing 24. Additionally, the casing 24 is equipped with a conventional groove 25 which receives the lock balls 26 (compare FIGS. 1 and 6) provided within the female half 20. Alternatively, the male coupling half 21 may be equipped with a poppet check valve rather than the ball check valve shown.

The female coupling 20 includes a housing 27 which is generally cylindrical and is equipped with an axially extending bore 28. The bore 28 is open at one end as at 29 to receive the male coupling 21. Slidably fitted within the bore 28 is a spool member 30 which closes the other end 31 of the bore 28. The spool member 30, as illustrated includes a pair of threadably engaged parts 32 and 33 (see FIG. 3) but in some instances the spool 30 may advantageously be a unitary part.

The housing 27 is also equipped with an annular recess 34 which is adapted to be connected via the nipple 35 with the hydraulic hose of a tractor or the like. Thus, pressure fluid flow within the coupling 20 follows essentially an L-shaped path in contrast to the straight line or axial path conventional quick disconnect couplings.

The spool 30 is also equipped with an axially extending bore as at 36 and which is open at one end (as at the right hand end as illustrated in FIG. 1).

Figure 6:
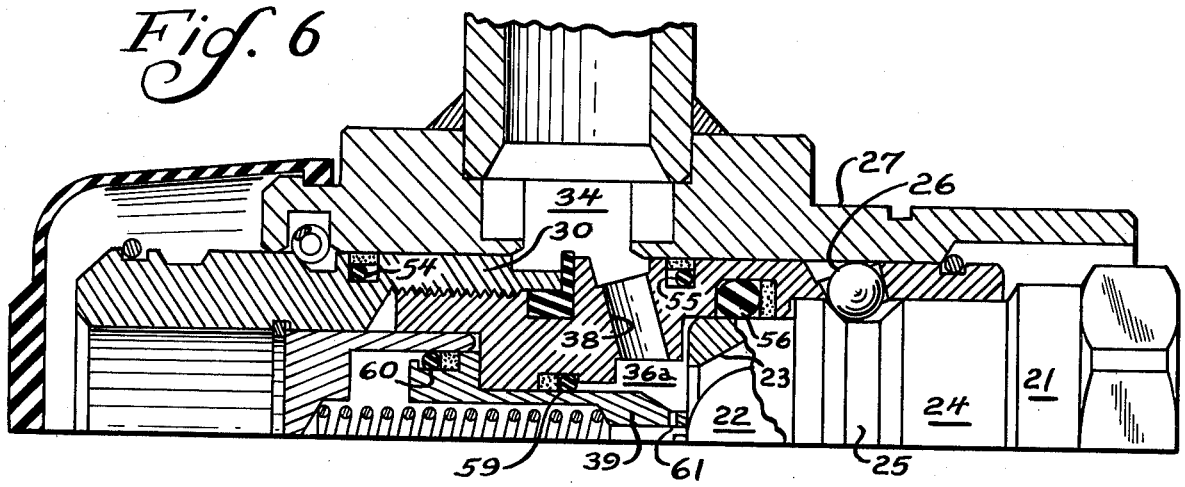

The other end of the bore 36 is closed by means of an abutment piece 37. Several generally radially extending passages 38 are provided within the spool 30 to communicate the bore 36 with the annular recess 34 of the housing 27 (compare FIGS. 1 and 6). The showing in FIG. 1 illustrates the spool 30 in the first or "closed" position while FIG. 6 illustrates the second or "open" position of the spool 30. Mounted within the bore 36 of the spool 30 is a valve actuator in the form of a piston 39 urged toward the open end of the groove by means of a spring 40. The spring 40 extends between the closed end 37 of the spool bore and an interior shoulder in the piston passage 39a (see FIG. 1).

OPERATION

Figure 5:
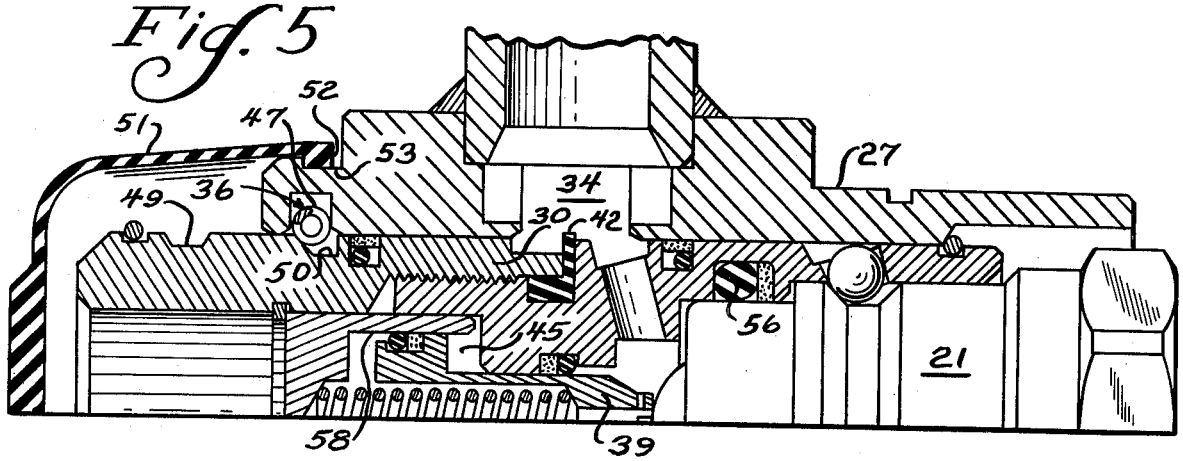

The operation of the inventive device can be quickly appreciated from a consideration of FIGS. 4–6 which illustrate the sequence of movement of internal portions of the male and female halves.

In FIG. 4, the connection sequence is just beginning, the male element 21 having been moved to the left (relative to the showing in FIG. 1) so as to be partly inserted into the open end 29 of the bore 28. A landed area 41 on the casing 24 engages the lock balls 26 to move the same radially outwardly during the time the ball check valve 22 has just contacted the forward end of the actuator piston 39. At this point in time, the laterally extending passages 38 of the spool 30 are blocked by the inner surface of the bore 28 so that the female valve half 20 is closed to fluid flow as well as is the male half 21.

An annular washer seal 42 is mounted within a groove 43 (see FIG. 3) provided within the spool part 32. The seal 42 has an integral boss 42a which is confined within the groove 43 by means of a lip 44 on the spool part 33. Fluid pressure in the tractor line (connected to the nipple 35) urges the seal 42 to the right (as illustrated) and against an abutment support provided by the part 32 (still referring to FIG. 3). Thus, when the device 20 is in the FIG. 4 condition, an advantageous and reliable barrier is interposed against leakage of pressure fluid from the tractor.

As further manual force is applied to the male element 21, it moves further to the left to the condition seen in FIG. 5. In so doing, the spool 30 is displaced to the left and so also is the piston 39 — developing the space designated 45 in FIG. 5 which does not exist in the preceding views. The spool 30 by virtue of having moved to the left brings the lateral passages 38 into alignment with the annular recess 34 of the housing 27.

The final step in the connection operation is the return of the piston 39 to the right with the consequent of unseating of the ball 22 from its seat 23 — this being pictured in FIG. 6. If the female half 20 is pressurized to a high enough pressure, the male valve 22 will open as soon as the connection is made. If the female half 20 is not pressurized, actuation of the tractor remote valve will pressure the female half, thereby opening the male valve 22 under the urging of the piston 39. Further, the piston 39 assists in opening the male valve 22 even when there is a pressure differential. Because the piston 39 has a greater effective area than that of the male valve 22, a lower pressure in the female device 20 can exert sufficient force to overcome a higher pressure in the male device 21.

For disconnection, the male element 21 is merely moved to the right (in the illustration given) and this operation results in pulling the spool 30 also to the right by virtue of the connection between the lock balls 26 and the groove 25. When the spool 30 has been moved sufficiently to the right so as to permit the lock balls 26 to move radially outwardly into the enlarged bore portion 28a (see FIG. 4), the male element 21 is free of attachment to the female element 20 — assuming the element configuration of FIG. 4. By this time, the lateral passages 38 has been closed by engagement with the inner surface of the bore 28 so that no pressure is exerted on the ball valve 22, permitting it to seat.

Positive means in the form of a detent arrangement generally designated 46 (see the left hand portion of FIG. 1) is provided to orient the spool in its alternative open and closed positions. The closed position is illustrated in FIG. 1 and there it will be seen that a garter spring 47 (see also FIG. 2) which is housed within an annular recess 48 of the housing 27, engages a groove 49 in the outer surface of the spool 30. In contrast, in the open position, the garter spring 47 engages a second groove 50 on the spool 30 in the open position — see FIG. 5.

It has been found advantageous to provide a supplemental closure at the left hand end of the housing 27 in the form of a rubber boot 51 (see FIG. 4). The boot 51 is generally cup-shaped and has a bead or flange 52 at its open end which is received within an annular groove 53 on the exterior of the housing 27. This serves to keep contamination out of the sliding confronting surfaces on the spool 30 and the bore 28 of the housing 27. The spool 30 additionally is equipped with axially spaced apart seals as at 54 and 55 (see FIG. 4) to restrict flow of pressure fluid to the passages 34, 38 and bore 36. Also, the spool 30 is equipped with an inner annular seal as at 56 (see FIG. 5) to prevent flow of pressure fluid around the male element 21.

In the illustration given, the bore of the spool 30 is equipped with an abutment piece 37 (see FIG. 1) which provides both the machined sliding surface 58 (see FIG. 5) for the piston 39 and also acts as a stop for one end of the spring 40. Thus, the abutment piece may be advantageously machined separately and inserted within the bore of the spool 30 and thereby eliminate a difficult machining operation. A pair of seals are provided between the piston 39 and the spool 30 as at 59 and 60 (see FIG. 6) — the latter more properly being between the piston 39 and the abutment piece 37. In any event, the seals 59 and 60 prevent flow of pressure fluid to the left and thereby cooperate with the seal 56 in directing the pressure fluid into the male element 21. Cavity 45 is vented to atmosphere by clearance between abutment piece 37 and bore of spool 30.

One additional feature of the piston 39 is to hold the ball valve 22 in the open condition during high flow conditions (see FIG. 6). When liquid is flowing in the direction of male-to-female half, there is a tendency for the ball 22 to close against the seat 23 due to pressure drop across the ball 22. The force of the spring 40 counteracting this tendency is not sufficient at high flow conditions. However, the pressure in the bore portion 36a is also inside of the piston 39 by virtue of the passage 61 in the small end of the piston 39. This pressure against the piston 39 assists the spring 40 in holding the ball 22 open. As the flow increases, pressure in the piston increases and the force generated by the piston increases.

Another advantageous feature of the invention can be appreciated from a consideration of FIG. 3. In the form illustrated there, the spool parts 32 and 33 are threadably interconnected as at 62. Through the provision of the parts 32 and 33, a retaining lip 44 can be provided to hold the seal 42 within the groove 43.

Still referring to FIG. 3, the arrows therein illustrate fluid flow in the operation of the washer seal 42 when disconnecting the coupling halves and while flowing liquid from the male element 21 to the passage 34. In this condition, the seal 42 deflects until pressure reduces on the right side of the seal. This feature prevents a high pressure differential across the seal 42 and thereby prevents damage and/or seal blowout.

Figure 10:
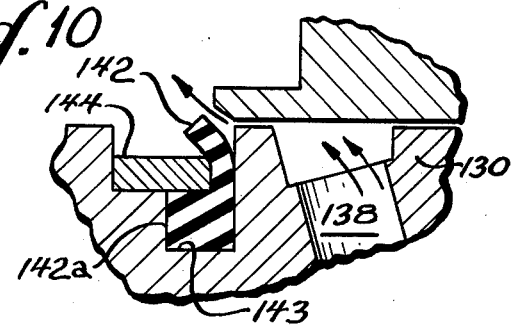
FIGS. 10–11 are enlarged fragmentary sectional views like FIG. 3 but showing alternate forms of seals.
Figure 11:
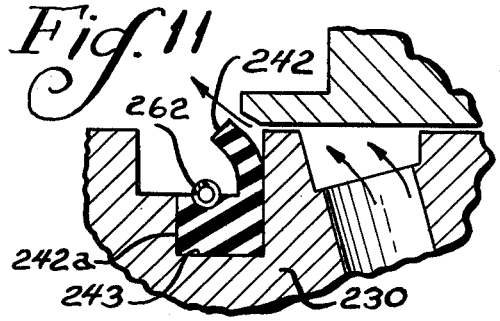

Reference is now made to FIGS. 10 and 11 which show alternative arrangements for the mounting of the washer seal. It has been found that the maintenance of this washer seal is an important element in the trouble-free operation of the novel quick coupling device. When it is desired to provide the spool 30 as a unitary, single element, the arrangements of seal mounting as seen in FIGS. 10 and 11 can be employed. In FIG. 10, the numeral 130 designates the spool which is seen to be equipped with the radially or laterally extending passages 138 similar to that designates 38 in FIG. 1 relative to the dual-component spool 30. The spool 30 is equipped with an annular groove as at 143 which receives the washer type seal 142. The washer type seal 142, as in the embodiment depicted in FIG. 3, has an integral boss portion 142a. The boss portion 142a is clamped within the groove 143 by means of an encircling band 144.

The arrangement of FIG. 11 is essentially similar to that of FIG. 10 utilizing a washer type seal 242 equipped with the boss 242a received within the groove 243 of the spool 230. An encircling wire or garter spring 262 is employed to retain 242 in 243.

Figure 7:
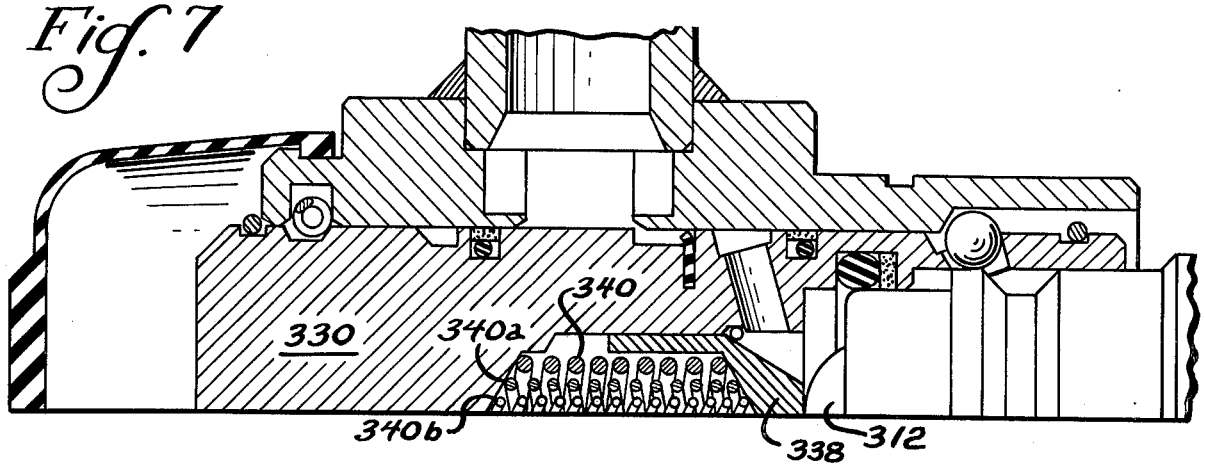
FIGS. 7–9 are fragmentary sectional views of a modified form of the invention showing a similar sequence of operations.
Figure 8:
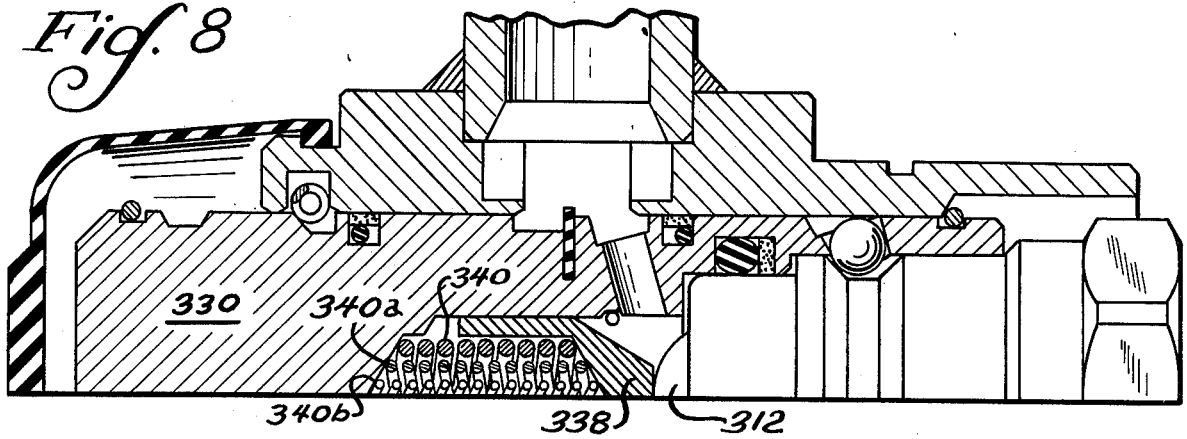
Figure 9:
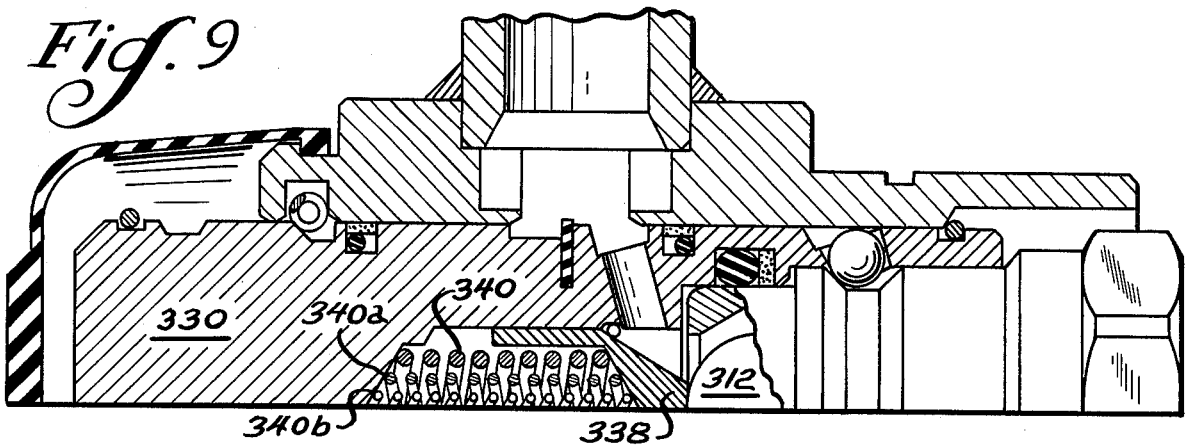

Turning now to FIGS. 7–9, a less expensive version of the invention can be seen in the various positions of the movable parts similar to FIGS. 4–6.

Here I provide a unitary spool 330 which carries a slidable actuator 338 and which engages the ball 312 of the male coupling device. Here, only spring actuation of the actuator 338 is provided — this in the form of springs 340, 340a and 340b. Again, however, the element 338 is a cup-shaped part but is not a piston with a seal on its outside diameter. Therefore, the actuator 338 is strictly spring-actuated, whereas the piston version seen in FIGS. 1–6 is both pressure and spring actuated. The actuator 338 does move in the same manner as the piston 39 within the spool 330 or 30, as the case may be. However, the piston 39 is pressure sensitive whereas the actuator 338 is not.

While in the foregoing specification, a detailed description of the invention has been set down for the purpose of illustration, many variations in the details

I claim:

1. A quick coupling device for coaction with a check valve-equipped male device comprising
   a generally cylindrical housing having an axially extending bore open at one end for receipt of said male device and having a radially extending passage communicating with said bore, said housing being closed to fluid flow at the at the other bore end,
   a source of pressure fluid connected to said radially extending passage,
   a spool slidably mounted in said bore and equipped with means for initially contacting said check valve in a first spool position and for maintaining said check valve open and establishing an L-shaped through conduit in a second spool position for flow from said source to said male device, and fluid pressure responsive means within said spool to assist opening and for maintaining said check valve open during reverse fluid flow from said male device to said radially extending passage.

2. The structure of claim 1 in which detent means are interposed between said housing and spool for maintaining said spool in a given position.

3. A quick coupling device for coaction with a check valve-equipped male device comprising
   a generally cylindrical housing having an axially extending bore open at one end for receipt of said male device and having a radially extending passage communicating with said bore,
   a spool slidably mounted in said bore and equipped with means for initially contacting said check valve in a first spool position and for maintaining said check valve open and establishing a through conduit in a second spool position, said spool having an axially extending bore and a radially extending passage communicating with said spool bore and alignable with said housing passage in said second spool position, said means including a resiliently mounted actuator in said spool bore.

4. The structure of claim 3 in which said actuator is a seal equipped piston.

5. The structure of claim 4 in which said piston has passage means for flow of pressure fluid therethrough to exert force on said male device check valve.

6. The structure of claim 3 in which said actuator is a cup shaped element presenting a closed face to said male device check valve.

7. The structure of claim 3 in which said spool is equipped with an annular washer seal adjacent said spool passage for contacting said housing in fluid sealing relation in said first spool position.

8. The structure of claim 7 in which said washer seal includes a central boss portion and an annular flange portion integral therewith, and means operatively associated with said spool for maintaining said seal in place.

9. The structure of claim 8 in which said associated means includes a peripheral groove in said spool, and clamping means overlying said groove for clamping said boss portion in said groove.

10. The structure of claim 9 in which said spool includes two parts threadably engaged, one part providing said groove, the other part providing said clamping means.

11. The structure of claim 9 in which said clamping means including an encircling band.

12. The structure of claim 11 in which a garter spring means constitutes said clamping means.

13. The structure of claim 1 in which said housing at the other end thereof is equipped with resilient boot means to prevent contamination of the sliding surfaces of said spool and housing.

14. A quick coupling device for coaction with a check valve-equipped male device comprising
   a generally cylindrical housing having an axially extending bore open at one end for receipt of said male device and closed at the other end and having an annular recess means for communicating said bore with a pressure supply,
   a spool slidably mounted in said housing bore and equipped with a bore coaxial with said housing bore and closed at the corresponding end for the receipt of a check valve actuator, a radially extending passage in said spool communicating said spool and housing bores,
   an actuator slidably mounted in said spool bore and resiliently urged in said bore toward the open end of said housing bore.

15. The structure of claim 14 in which said actuator is a hollow piston having a bore extending axially therethrough, said spool bore being closed at the end thereof opposite said housing bore open end, said piston bore including a spring-retaining interior shoulder, said piston extending toward said one end beyond said shoulder to provide a check valve engaging lip portion, and a passage in said lip portion to equalize pressure within said piston bore and spool bore.

16. The structure of claim 14 in which said spool is equipped with an annular, outwardly facing groove positioned between said spool radially extending passage and the closed end of said spool, a boss-equipped annular seal in said groove, and means on said spool clamping the boss of said seal within said groove.

* * * * *